US007616686B2

(12) United States Patent
Aziz et al.

(10) Patent No.: US 7,616,686 B2
(45) Date of Patent: Nov. 10, 2009

(54) METHOD AND APPARATUS FOR GENERATING ONE OR MORE CLOCK SIGNALS FOR A DECISION-FEEDBACK EQUALIZER USING DFE DETECTED DATA

(75) Inventors: Pervez M. Aziz, Dallas, TX (US);
Gregory W. Sheets, Bangor, PA (US);
Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 519 days.

(21) Appl. No.: 11/356,691

(22) Filed: Feb. 17, 2006

(65) Prior Publication Data

US 2007/0195874 A1    Aug. 23, 2007

(51) Int. Cl.
*H03H 7/30* (2006.01)
(52) U.S. Cl. ...................................... 375/233
(58) Field of Classification Search ................. 375/232, 375/233, 355
See application file for complete search history.

(56) References Cited

OTHER PUBLICATIONS

Stojanovic et al., "Autonomous Dual-Mode (PAM2/4) Serial Link Transceiver with Adaptive Equalization and Data Recovery," IEEE Journal of Solid-State Circuits, vol. 40, No. 4, pp. 1012-1026 (Apr. 2005).

*Primary Examiner*—Kevin Y Kim
(74) *Attorney, Agent, or Firm*—Ryan, Mason & Lewis, LLP

(57) ABSTRACT

Methods and apparatus are provided for generating one or more clock signals for a decision-feedback equalizer using DFE detected data. A received signal is sampled using a data clock and a transition clock to generate a data sample signal and a transition sample signal, respectively. A DFE correction is obtained for each of the data sample and transition sample signals to generate DFE detected data and a DFE transition data. The DFE detected data and DFE transition data are then applied to a phase detector that generates a signal to adjust a phase of one or more of the data clock and transition clock. In a multi-level implementation, the received signal is sampled using a clock associated with each of the levels and the samples are latched using a vertical slicing technique to generate DFE data associated with each of said levels.

22 Claims, 9 Drawing Sheets

FIG. 2

| $\hat{y}(n-1)$ | $\hat{y}(n-1/2)$ | $\hat{y}(n)$ | PDOUT |
|---|---|---|---|
| 0 | 0 | 0 | 0 (NO DATA TRANSITION) |
| 0 | 0 | 1 | −1 |
| 0 | 1 | 0 | 0 |
| 0 | 1 | 1 | 1 |
| 1 | 0 | 0 | 1 |
| 1 | 0 | 1 | 0 |
| 1 | 1 | 0 | −1 |
| 1 | 1 | 1 | 0 (NO DATA TRANSITION) |

FIG. 6
| $\hat{y}_d(n-1)$ | $\hat{y}_{dt}(n)$ | $\hat{y}_d(n)$ | DFE_PDOUT |
|---|---|---|---|
| 0 | 0 | 0 | 0 (NO DATA TRANSITION) |
| 0 | 0 | 1 | −1 |
| 0 | 1 | 0 | 0 |
| 0 | 1 | 1 | 1 |
| 1 | 0 | 0 | 1 |
| 1 | 0 | 1 | 0 |
| 1 | 1 | 0 | −1 |
| 1 | 1 | 1 | 0 (NO DATA TRANSITION) |
FIG. 7A
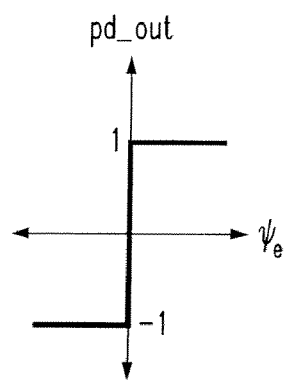
FIG. 7B
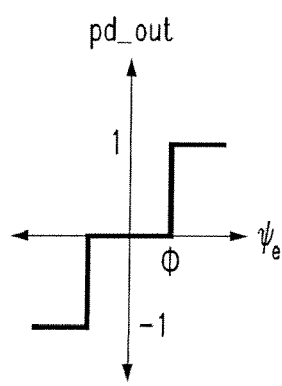
FIG. 7C
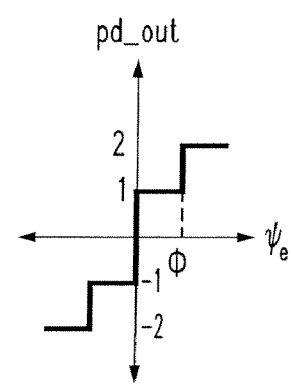

METHOD AND APPARATUS FOR GENERATING ONE OR MORE CLOCK SIGNALS FOR A DECISION-FEEDBACK EQUALIZER USING DFE DETECTED DATA

CROSS-REFERENCE TO RELATED APPLICATIONS

The present application is related to U.S. Patent Application entitled "Method and Apparatus for Adaptively Establishing a Sampling Phase for Decision-Feedback Equalization," filed contemporaneously herewith and incorporated by reference herein.

FIELD OF THE INVENTION

The present invention relates generally to decision-feedback equalization techniques, and more particularly, to techniques for generating one or more clock signals for a decision-feedback equalizer using DFE detected data.

BACKGROUND OF THE INVENTION

Digital communication receivers must sample an analog waveform and then reliably detect the sampled data. Signals arriving at a receiver are typically corrupted by intersymbol interference (ISI), crosstalk, echo, and other noise. Thus, receivers must jointly equalize the channel, to compensate for such distortions, and decode the encoded signals at increasingly high clock rates. Decision-feedback equalization (DFE) is a widely-used technique for removing intersymbol interference and other noise. For a detailed discussion of decision feedback equalizers, see, for example, R. Gitlin et al., Digital Communication Principles, (Plenum Press 1992) and E. A. Lee and D. G. Messerschmitt, Digital Communications, (Kluwer Academic Press, 1988), each incorporated by reference herein. Generally, decision-feedback equalization utilizes a nonlinear equalizer to equalize the channel using a feedback loop based on previously decided symbols.

In one typical DFE implementation, a received analog signal is sampled and compared to one or more thresholds to generate the detected data. A DFE correction, v(t), is subtracted in a feedback fashion to produce a DFE corrected signal w(t). The same clock, generated from the received signal by a clock and data recovery (CDR) circuit, is generally used to sample the incoming signal and for the DFE operation. Typically, the entire DFE loop correction must be performed within one baud period T before the next correction is needed. At very high data rates, however, it is difficult to design circuits that operate this fast or to make them very accurate. Consequently, a number of techniques have been proposed or suggested for precomputing the DFE terms. Since there is no DFE feedback loop, the process of generating the DFE "corrected" decisions can be pipelined. In such a DFE precomputation implementation, the DFE correction is not fed back to correct the received signal and the input to the CDR circuit is thus non-DFE detected data. Thus, the CDR circuit processes unequalized data that still contains channel impairments.

A need therefore exists for methods and apparatus for generating one or more clock signals for a decision-feedback equalizer using DFE detected data.

SUMMARY OF THE INVENTION

Generally, methods and apparatus are provided for generating one or more clock signals for a decision-feedback equalizer using DFE detected data. According to one aspect of the invention, a received signal is sampled using a data clock and a transition clock to generate a data sample signal and a transition sample signal. A DFE correction is obtained for each of the data sample and transition sample signals to generate DFE detected data and a DFE transition data. The DFE detected data and DFE transition data are then applied to a phase detector that generates a signal to adjust a phase of one or more of the data clock and transition clock. In one embodiment, an output of the phase detector is applied to a clock and data recovery (CDR) circuit that generates the data and transition clocks. The phase detector can be embodied, for example, as a bang-bang phase detector or a multi-level oversampled phase detector.

In a multi-level implementation, the received signal is sampled using a clock associated with each of the levels and the samples are latched using a vertical slicing technique to generate DFE data associated with each of said levels.

A more complete understanding of the present invention, as well as further features and advantages of the present invention, will be obtained by reference to the following detailed description and drawings.

BRIEF DESCRIPTION OF THE DRAWINGS

FIG. 2 is a table characterizing the input/output relationship of the BBPD of FIG. 1;

FIG. 6 is a sample truth table for the exemplary DFE equalized BBPD of FIG. 5;

FIGS. 7A, 7B and 7C illustrate transfer characteristics of a two level bang-bang phase detector, a three level phase detector and a four level phase detector, respectively;

DETAILED DESCRIPTION

Figure 1:
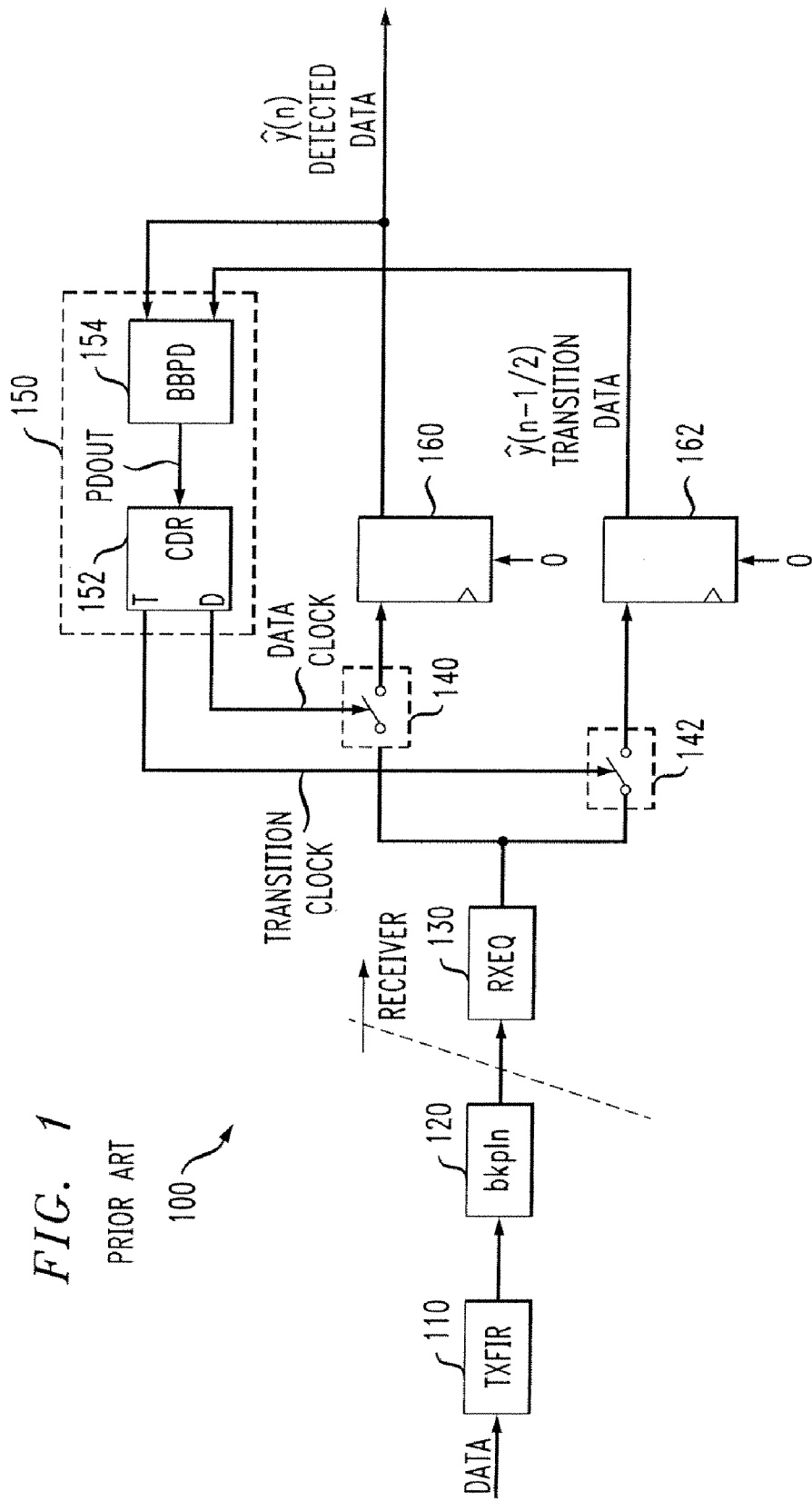
FIG. 1 is a block diagram of a conventional serializer/deserializer communication channel having a channel impairment.

The present invention provides methods and apparatus for generating one or more clock signals for a decision-feedback equalizer using DFE detected data. FIG. 1 is a block diagram of a conventional serializer/deserializer communication channel 100 having a channel impairment that is due, for example, to a physical transmission medium, such as a backplane or drive head in a magnetic recording system. In the exemplary implementation shown in FIG. 1, the data is transmitted through a backplane channel 120 after optionally being equalized or filtered through a transmit FIR filter (TX-FIR) 110. After passing though the backplane 120, the analog signal may optionally be filtered or equalized by a receive equalizer (RXEQ) 130 which may consist, for example, of a continuous time filter. The analog signal out of the RXEQ 130 is sampled at the baud rate by a switch 140 using a sampling clock generated by a clock/data recovery (CDR) circuit 150. A data detector 160 (or a slicer) digitizes the sample and compares the digitized sample to an exemplary threshold of zero, using the CDR recovered clock.

The phase of the analog waveform is typically unknown and there may be a frequency offset between the frequency at which the original data was transmitted and the nominal receiver sampling clock frequency. The function of the CDR 150 is to properly sample the analog waveform such that when the sampled waveform is passed through a data detector 160, the data is recovered properly despite the fact that the phase and frequency of the transmitted signal is not known. The CDR 150 is often an adaptive feedback circuit and the feedback loop must adjust the phase and frequency of the nominal clock to produce a modified recovered clock that can sample the analog waveform to allow proper data detection.

As previously indicated, the data detector 160 can be implemented as a slicer (i.e., a decision device based on an amplitude threshold) or a more complicated detector such as a sequence detector. For high speed applications, the data detector 160 is often implemented as a slicer that is clocked by the CDR clock. In addition to sampling the data signal, the slicer 160 essentially quantizes the signal to a binary "1" or "0" based on the sampled analog value and a slicer threshold, $s_t$. If the input to the slicer 160 at time n is w(n), then the output, $\hat{y}$ (n), of the slicer 160 is given as follows:

$$\hat{y}(n) = 1 \quad \text{if } w(n) > s_t \quad (1)$$
$$= 0 \quad \text{otherwise}$$

In general, the CDR 150 may be composed of several components, such as a phase detector (PD), a loop filter, and a clock generation circuit. As shown in FIG. 1, the exemplary CDR 150 is comprised of a loop filter 152 embodied as a digital loop filter (CDR loop filter and clock generation) and a phase detector 154 embodied as a bang-bang phase detector (BBPD). For a discussion of bang-bang phase detector, see, for example, J. D. H. Alexander, "Clock Recovery from Random Binary Signals," Electronics Letters, 541-42 (October, 1975), incorporated by reference herein.

The BBPD 154 processes several quantities to compute an estimate of timing adjustment needed to properly sample the signal, in a known manner. The timing adjustment is filtered by the loop 152 before adjusting the phase of the sampling clocks. For the BBPD 154, there needs to be two sampling clocks: a data sampling clock which samples the recovered data and a transition sampling clock that is offset from the data clock by half a baud period T/2 and which samples the "transition" data. The transition sample data is denoted as $\hat{y}(n-\frac{1}{2})$ to indicate is sampled relative to $\hat{y}(n)$ by a phase offset of T/2. In addition, the BBPD 154 makes use of a one baud period delayed version of the recovered data. The delayed data is $\hat{y}(n-1)$ (not shown explicitly in FIG. 1). Generally, the delayed data, $\hat{y}(n-1)$, can be created internally by the BBPD 154 from $\hat{y}(n)$. The BBPD input/output relationship is characterized by the look up table 200 shown in FIG. 2. Since the BBPD 154 requires more than one sample per baud period, the BBPD 154 is classified as an oversampled phase detector.

DFE Background

As data rates increase for serializer/deserializer applications, the channel quality degrades and the use of decision feedback equalization (DFE) in conjunction with finite impulse response (TXFIR) and receive equalization (RXEQ) filtering will be required to achieve the bit error rate (BER) performance required by more and more demanding applications. Note that the FIR function of the transmitter (TX) might be moved from the transmitter to the receiver (RX) and incorporated into the RXEQ function.

Figure 3:
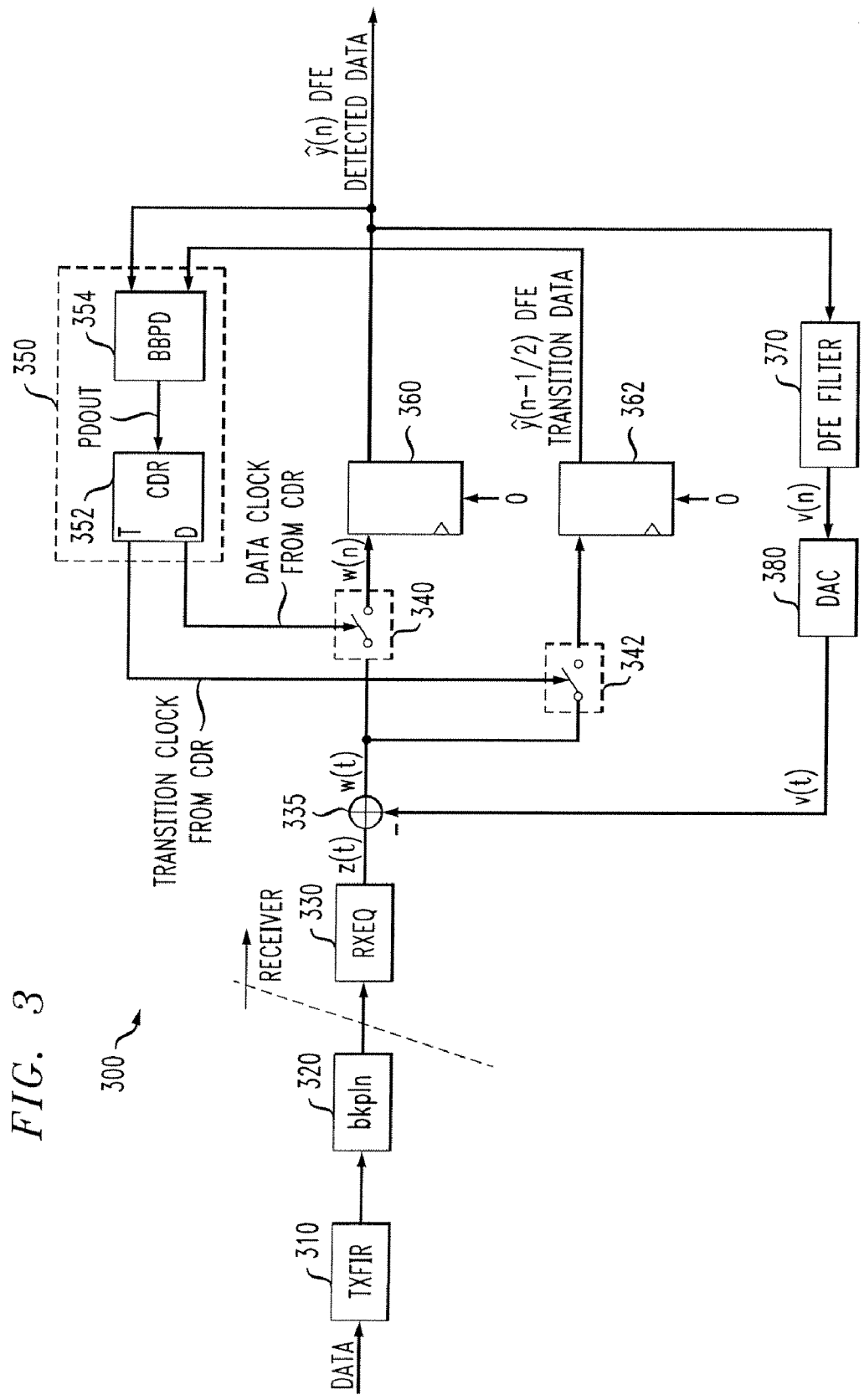
FIG. 3 is a block diagram of a serializer/deserializer communication channel incorporating a traditional DFE based equalizer.

FIG. 3 is a block diagram of a serializer/deserializer communication channel 300 that incorporates a traditional DFE based equalizer in addition to the TX and RX equalization of FIG. 1. As shown in FIG. 3, the data is transmitted through a backplane channel 320 after optionally being equalized or filtered through a transmit FIR filter (TXFIR) 310. After passing through the backplane 320, the analog signal may optionally be filtered or equalized by a receive equalizer (RXEQ) 330 which may consist, for example, of a continuous time filter. The analog signal out of the RXEQ 330 is sampled at the baud rate by a switch 340 using a sampling clock generated by a clock/data recovery (CDR) circuit 352, in a similar manner to FIG. 1.

As discussed hereinafter, a DFE correction, v(t), generated by a DFE filter 370 and digitized by a digital-to-analog converter 380 is subtracted by an analog summer 335 from the output, z(t), of the RXEQ 330 to produce a DFE corrected signal w(t).

$$w(t)=z(t)-v(t) \quad (2)$$

Then, the signal w(t) is sampled by a switch 340:

$$w(n)=w(nT) \quad (3)$$

with T being the baud period. The sampled signal w(n) is then sliced by a slicer 360 to produce the detected data $\hat{y}$ (n). The slicer output in turn is used to produce the filtered DFE output v(n) which is converted by the DAC 380 to the continuous time signal v(t). The DFE filter output 380 is given by:

$$v(n) = \sum_{l=1}^{L} b(l)\hat{y}(n-l) \quad (4)$$

where b(l) represents the coefficients of the L tap DFE.

As discussed above in conjunction with FIG. 1, the BBPD 354 requires two sampling clocks: a data sampling clock which samples the recovered data and a transition sampling clock that is offset from the data clock by half a baud period T/2 and which samples the "transition" data. The analog signal out of the RXEQ 330 is sampled at the baud rate by a switch 342 using the transition clock. The sampled signal w(n) is also sliced by a second slicer 362 to produce the detected data $\hat{y}$ (n-½). The transition sample data is denoted as $\hat{y}(n-\frac{1}{2})$ to indicate is sampled relative to $\hat{y}(n)$ by a phase offset of T/2.

It is noted that the DFE filter 370 uses as its input past data decisions starting at y(n-1) and earlier. The DFE filter 370 does not use the current decision $\hat{y}$ (n). This guarantees that the operation is causal. Since an analog representation, w(t), of the DFE signal exists, it can be sampled directly by both the data clock using switch 340 (to produce w(n)) and the transition clock using switch 342 and these sampled latched signals can drive a traditional BBPD 354. For this circuit 300 to work, the entire DFE loop correction must be performed within one baud period T before the next correction is needed. At very high data rates, it is difficult to design circuits that operate this fast or to make them very accurate.

Consequently, a well known technique may be employed whereby the DFE terms are "precomputed" and chosen based upon the amplitude value of y(n). Since there is no DFE feedback loop, the process of generating the DFE "corrected" decisions can be pipelined.

Figure 4:
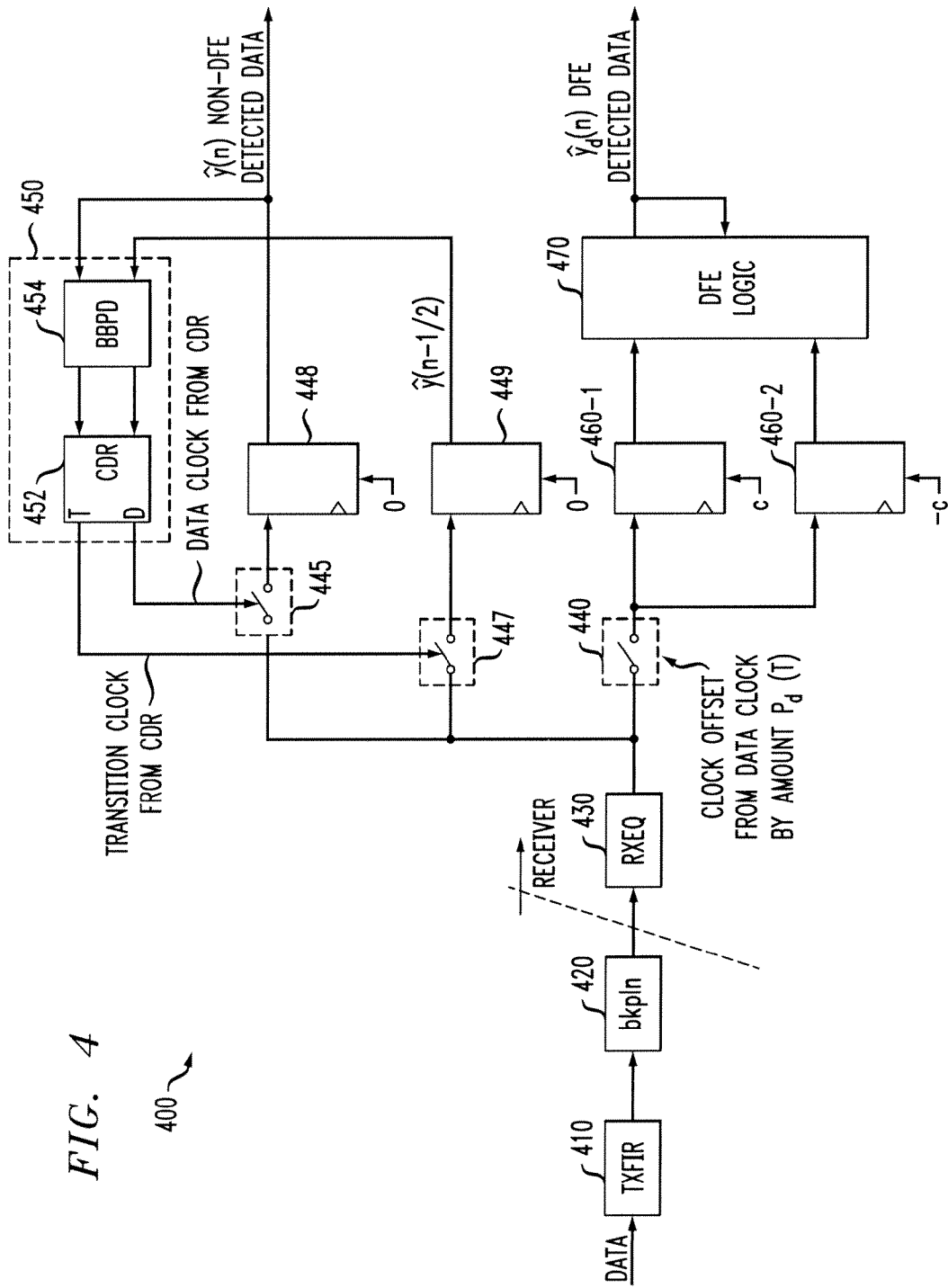
FIG. 4 is a block diagram of a serializer/deserializer communication channel that incorporates precomputation of the DFE terms.

FIG. 4 is a block diagram of a serializer/deserializer communication channel 400 that incorporates precomputation of the DFE terms, in addition to the TX and RX equalization of FIGS. 1 and 3. The exemplary embodiment shown in FIG. 4 is for a one tap (L=1) DFE that makes use of a DFE coefficient b(1). For simplicity of notation, b(1) is denoted by the variable c.

As shown in FIG. 4, the data is transmitted through a backplane channel 420 after optionally being equalized or filtered through a transmit FIR filter (TXFIR) 410. After passing though the backplane 420, the analog signal may optionally be filtered or equalized by a receive equalizer (RXEQ) 430. The analog output of the RXEQ 430 is sampled at the baud rate by switches 440, 445, 447. The switch 445 uses a data clock generated by the clock/data recovery circuit 452 and switch 447 uses a transition clock generated by the clock/data recovery circuit 452, in a similar manner to FIG. 3. Latches 448, 449 having exemplary thresholds of 0 are used to generated a decision from the non-DFE equalized signal, in a similar manner to FIG. 3.

As shown in FIG. 4, exemplary latches 460-1 and 460-2 having thresholds of c and −c, respectively, are used to generate a decision for the DFE equalized signal. The decisions from the DFE slicer latches 460 are combined by the DFE logic 470 with the previous DFE detected bit decision, $\hat{y}_d(n-1)$ (represented in FIG. 4 by the arrow fed back into the DFE logic block 470) to produce the final DFE corrected decision $\hat{y}_d(n)$. The DFE path computation logic can be pipelined thereby eliminating the bottleneck of having to complete the computation in one baud period. The DFE logic 470 selects from the pre-computed decisions, which are the outputs of the latches 460 with thresholds c and c, based on the past decision $\hat{y}_d(n-1)$.

For the case when $\hat{y}_d(n-1) = 1$, $\hat{y}_d(n) = 1$ if $y(n) > c$
$\quad\quad\quad = 0$ if $y(n) < c$ For the case when $\hat{y}_d(n-1) = 0$, $\hat{y}_d(n) = 1$ if $y(n) > -c$
$\quad\quad\quad = 0$ if $y(n) < -c$ The outputs of the latches 460 are applied to DFE logic 470 to generate the DFE corrected decision $\hat{y}_d(n)$.

The CDR and DFE operations may have different optimal sampling points. Therefore, the DFE latches should be sampled with a correct sampling phase that may be offset from the normal CDR data clock sampling phase by some offset $p_d$ in units of baud interval T. Thus, the switch 440 in the DFE path is controlled by a clock that is offset from the CDR data clock by an amount equal to $p_d(T)$. A number of techniques have been proposed or suggested for manually establishing the offset $p_d(T)$. The optimal sampling phase, however, is dependent on the channel or other equalizer settings. Thus, the sampling phase can be adaptively determined using the techniques described in United States Patent Application entitled "Method and Apparatus for Adaptively Establishing a Sampling Phase for Decision-Feedback Equalization," filed contemporaneously herewith and incorporated by reference herein.

It is noted that the DFE can extended to more than one tap at the expense of additional area and computation time. The exemplary DFE phase placement circuit presented herein can be extended to a system with multiple DEE taps without changing the DFE phase placement circuit. For additional taps, the number of latches and the DFE logic block would be modified, as would be apparent to a person of ordinary skill in the art.

In the DFE precomputation embodiment shown in FIG. 4, the DFE correction is not fed back to correct the output of the RXEQ 430 and the BBPD 454 is thus controlled by non-DFE detected data ŷ (n) and ŷ (n−½). Thus, the BBPD 154, 354, 454 is processing unequalized data ŷ (n) and ŷ (n−½) containing channel impairments. The present invention provides methods and apparatus for generating one or more clock signals for a decision-feedback equalizer using DFE detected data.

DFE Clock Generation Using DFE Detected Data

The present invention provides a method and apparatus for performing an oversampled phase detection of a DFE equalized signal as part of a clock/data recovery (CDR) loop.

As discussed hereinafter in conjunction with FIG. 5, the present invention creates appropriate signals to drive an oversampled phase detector, such as a BBPD, to compute the required phase adjustment for a DFE equalized signal. In particular the present invention generates a "DFE transition" data $\hat{y}_{dt}(n)$ using rules similar to that of the regular DFE data $\hat{y}_d(n)$. The DFE transition data $\hat{y}_{dt}(n)$ is obtained based on the non-DFE transition sample amplitude values using the same DFE logic from which the DFE recovered data $\hat{y}_d(n)$ is obtained from the non-DFE data clock sampled amplitude y(n).

DFE Equalized BBPD

Figure 5:
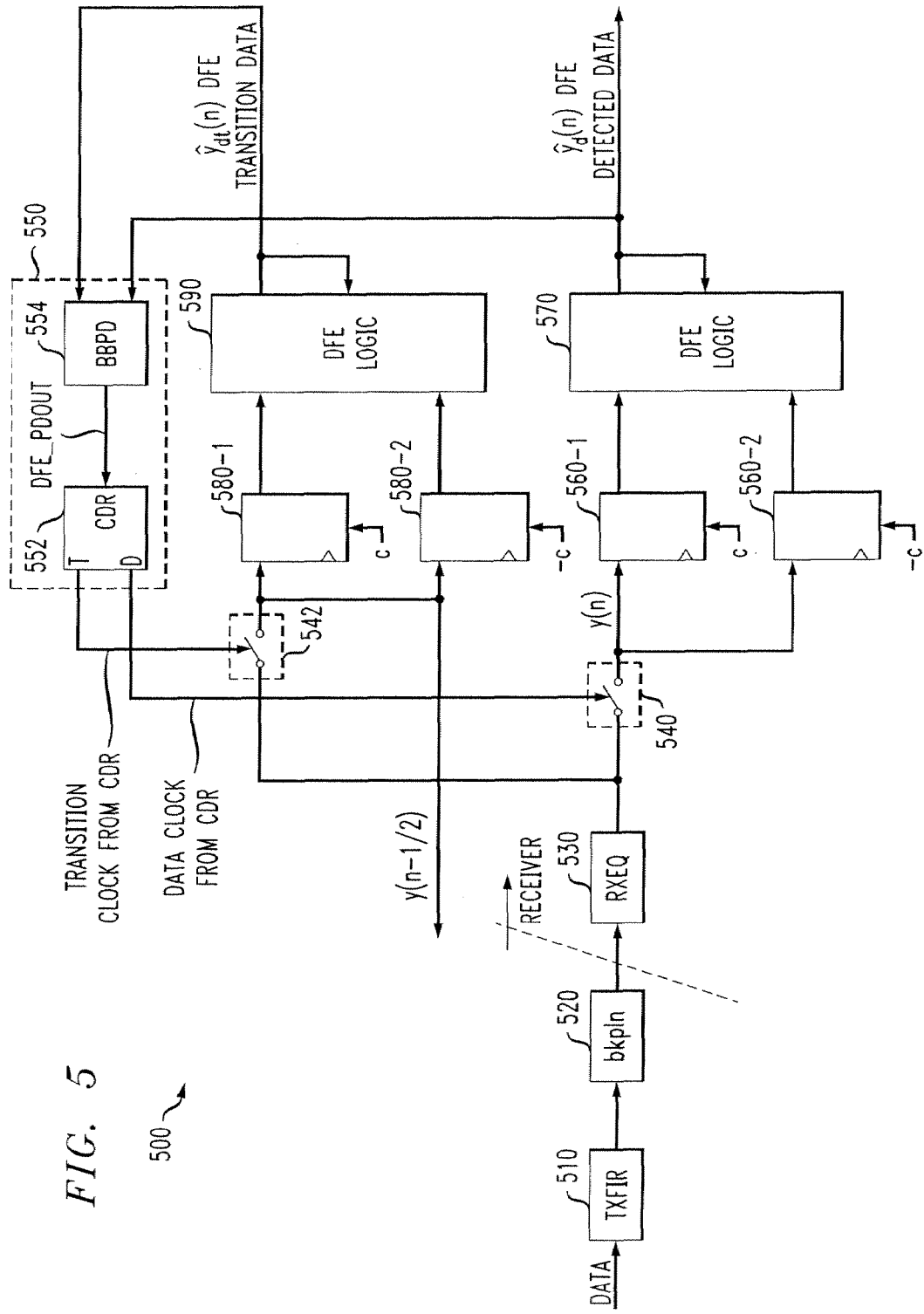
FIG. 5 is a block diagram of a serializer/deserializer communication channel in accordance with the present invention.

FIG. 5 is a block diagram of a serializer/deserializer communication channel 500 in accordance with the present invention. The channel 500 of FIG. 5 comprises a transmit FIR filter (TXFIR) 510, backplane channel 520, RXEQ 530, switch 540, CDR circuit 550, exemplary latches 560-1 and 560-2, and DFE logic 570, in a similar manner to FIG. 4.

In addition, the channel 500 includes a switch 543, latches 580-1 and 580-2, and DFE logic 590, for the creation of the DFE transition data. The DFE transition data is created as follows:

For the case when $\hat{y}_{dt}(n-1) = 1$, $\hat{y}_{dt}(n) = 1$ if $y(n-1/2) > c$
$\quad\quad\quad = 0$ if $y(n-1/2) < c$ For the case when $\hat{y}_{dt}(n-1) = 0$, $\hat{y}_{dt}(n) = 1$ if $y(n-1/2) > -c$
$\quad\quad\quad = 0$ if $y(n-1/2) < -c'$ where y(n−½) represents the amplitude of the non-DFE transition sampled data.

FIG. 6 is a sample truth table 600 for the exemplary DFE equalized BBPD 554 of FIG. 5. Generally, the truth table 600 remains the same as above, but is now driven by the DFE detected data $\hat{y}_d(n)$ as well as the synthesized DFE transition data $\hat{y}_{dt}(n)$ created in the manner described above.

DFE Equalized Multi Level Phase Detectors

The DFE equalized BBPD 554 of FIG. 5 can be extended to produce more output levels corresponding to finer estimates of the timing error. See, for example, Y. Choi et al., "Jitter Transfer Analysis of Tracked Oversampling Techniques for Multigigbit Clock and Data Recovery," IEEE Trans. on Circuits and Systems, 775-83 (November 2003). The BBPD 554 provides a two level estimate of the timing error as shown by the transfer characteristic of FIG. 7A. A phase detector with more levels makes this transfer curve relating timing (sampling phase) error to PD output more linear. Therefore, phase detectors with additional levels are referred to as quasi-linear phase detectors (QLPDs). Consider a four level QLPD (also referred to as QLPD4) whose transfer characteristic is shown in FIG. 7C. Instead of representing the truth table in tabular form, the QLPD4 output can be efficiently represented in terms of the following conditions:

if ($\hat{y}(n-1)==0$ & $\hat{y}(n-\frac{1}{2}-\phi)==0$ & $\hat{y}(n-\frac{1}{2})==0$ & $\hat{y}(n-\frac{1}{2}+\phi)==0$ & $\hat{y}(n)==1$)PDOUT=−2, else if ($\hat{y}(n-1)==0$ & $\hat{y}(n-\frac{1}{2}-\phi)==0$ & $\hat{y}(n-\frac{1}{2})==0$ & $\hat{y}(n-\frac{1}{2}+\phi)==1$ & $\hat{y}(n)==1$)PDOUT=−1, else if ($\hat{y}(n-1)==0$ & $\hat{y}(n-\frac{1}{2}-\phi)==0$ & $\hat{y}(n-\frac{1}{2})==1$ & $\hat{y}(n-\frac{1}{2}+\phi)==1$ & $\hat{y}(n)==1$)PDOUT=1, else if ($\hat{y}(n-1)==0$ & $\hat{y}(n-\frac{1}{2}-\phi)==1$ & $\hat{y}(n-\frac{1}{2})==1$ & $\hat{y}(n-\frac{1}{2}+\phi)==1$ & $\hat{y}(n)==1$)PDOUT=2, else if ($\hat{y}(n-1)==1$ & $\hat{y}(n-\frac{1}{2}-\phi)==1$ & $\hat{y}(n-\frac{1}{2})==1$ & $\hat{y}(n-\frac{1}{2}+\phi)==1$ & $\hat{y}(n)==0$)PDOUT=−2, else if ($\hat{y}(n-1)==1$ & $\hat{y}(n-\frac{1}{2}-\phi)==1$ & $\hat{y}(n-\frac{1}{2})==1$ & $\hat{y}(n-\frac{1}{2}+\phi)==0$ & $\hat{y}(n)==0$)PDOUT=−1, else if ($\hat{y}(n-1)==1$ & $\hat{y}(n-\frac{1}{2}-\phi)==1$ & $\hat{y}(n-\frac{1}{2})==0$ & $\hat{y}(n-\frac{1}{2}+\phi)==0$ & $\hat{y}(n)==0$)PDOUT=1, else if ($\hat{y}(n-1)==1$ & $\hat{y}(n-\frac{1}{2}-\phi)==0$ & $\hat{y}(n-\frac{1}{2})==0$ & $\hat{y}(n-\frac{1}{2}+\phi)==0$ & $\hat{y}(n)==0$)PDOUT=2, else if ($\hat{y}(n-1)==1$ & $\hat{y}(n-\frac{1}{2})==0$ & $\hat{y}(n)==1$)PDOUT=1, else if ($\hat{y}(n-1)==1$ & $\hat{y}(n-\frac{1}{2})==0$ & $\hat{y}(n)==1$)PDOUT=1, else PDOUT=0 where $\phi$ is a timing offset parameter, $0<\phi<0.5$, which can be optimized; a==b checks whether a is equal to b; and "&" represents a logical AND operation.

Figure 8:
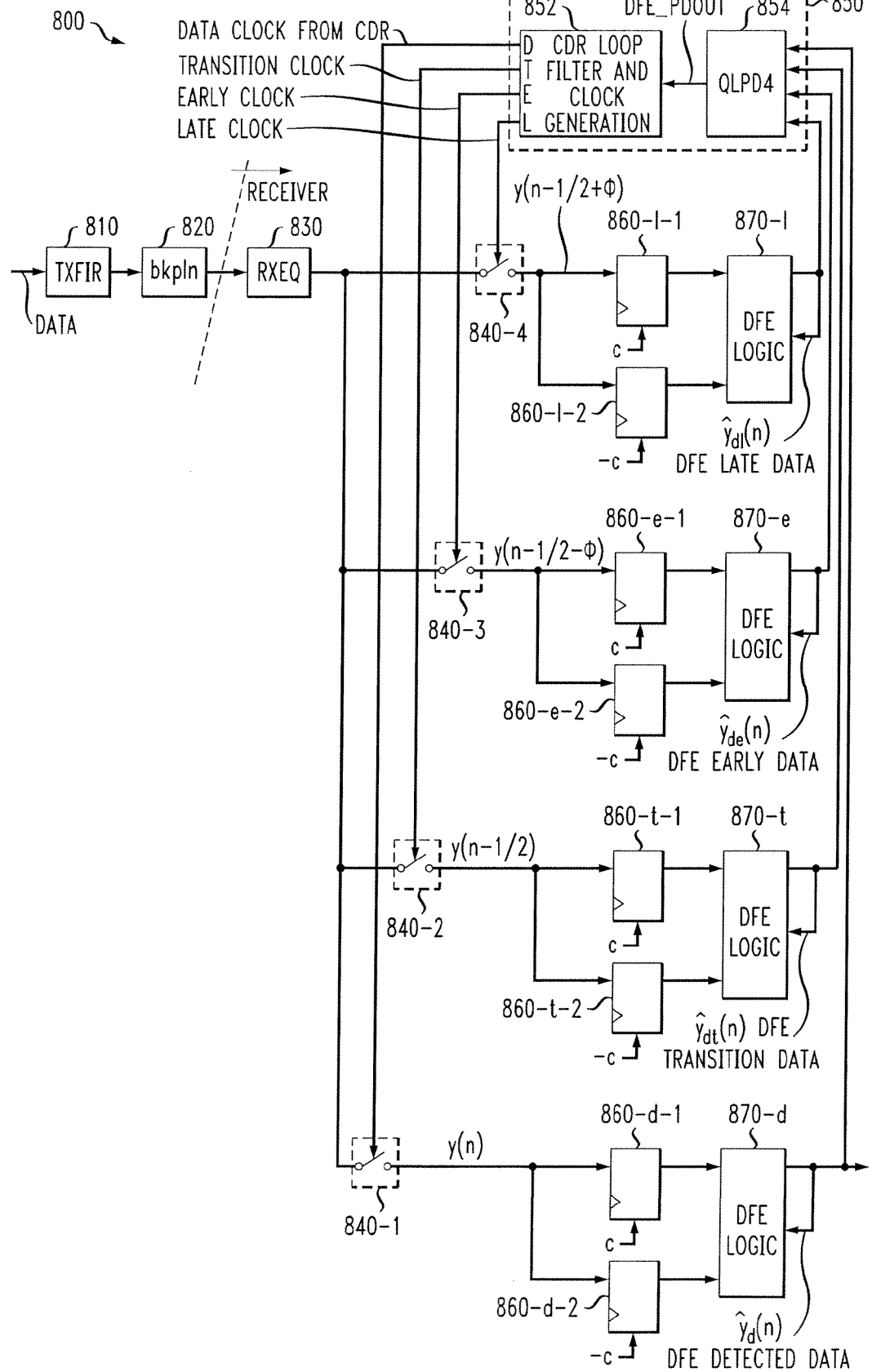
FIG. 8 is a block diagram of an exemplary four level oversampled phase detector based DFE equalized CDR.

FIG. 8 is a block diagram of an exemplary four level oversampled phase detector based DFE equalized CDR 800. The channel 800 of FIG. 8 comprises a transmit FIR filter (TXFIR) 810, backplane channel 820 and RXEQ 830, in a similar manner to FIG. 5.

In addition, the channel 800 comprises four switches 840-1 through 840-4 to sample the analog output of the RXEQ 830 at the baud rate, each according to a corresponding clock. The signal $\hat{y}(n-\frac{1}{2}-\phi)$ and $\hat{y}(n-\frac{1}{2}+\phi)$ are called the "early" and "late" data being produce from "early" and "late" clocks which are offset from the transition clock by a phase $-\phi$ and $\phi$, respectively.

As shown in FIG. 8, four pairs of exemplary latches 860-1, 860-e, 860-t and 860-d having thresholds of c and −c, respectively, are used to generate late, early, transition and detected data decisions for the DFE equalized signal, respectively.

For the DFE equalized version of this, "early" and "late" DFE data must be constructed in addition to the DFE transition data, as follows:

For the case when $\hat{y}_{de}(n-1) = 1$, $\hat{y}_{de}(n) = 1$ if $y(n-1/2-\phi) > c$
$\quad\quad\quad = 0$ if $y(n-1/2-\phi) < c$ For the case when $\hat{y}_{de}(n-1) = 0$, $\hat{y}_{de}(n) = 1$ if $y(n-1/2-\phi) > -c$
$\quad\quad\quad = 0$ if $y(n-1/2-\phi) < -c$ For the case when $\hat{y}_{dl}(n-1) = 1$, $\hat{y}_{dl}(n) = 1$ if $y(n-1/2+\phi) > c$
$\quad\quad\quad = 0$ if $y(n-1/2+\phi) < c$ For the case when $\hat{y}_{dl}(n-1) = 0$, $\hat{y}_{dl}(n) = 1$ if $y(n-1/2+\phi) > -c$
$\quad\quad\quad = 0$ if $y(n-1/2+\phi) < -c$ The DFE detected data, transition data, early data, late data (and delayed detected data) generated by the DFE logic 870-d, 870-t, 870-e and 870-l, respectively, are used as the input to the QLPD4 phase detector 854 operation to produce the overall DFE phase detector output timing estimate:

if ($\hat{y}_d(n-1)==0$ & $\hat{y}_{de}==0$ & $\hat{y}_{dt}==0$ & $\hat{y}_{dl}==0$ & $\hat{y}_d(n)==1$)DFE_PDOUT=−2, else if ($\hat{y}_d(n-1)==0$ & $\hat{y}_{de}==0$ & $\hat{y}_{dt}==0$ & $\hat{y}_{dl}==1$) & $\hat{y}_d(n)==1$)DFE_PDOUT=−1, else if ($\hat{y}_d(n-1)==0$ & $\hat{y}_{de}==0$ & $\hat{y}_{dt}==1$ & $\hat{y}_{dl}==1$) & $\hat{y}_d(n)==1$)DFE_PDOUT=1, else if ($\hat{y}_d(n-1)==0$ & $\hat{y}_{de}==1$ & $\hat{y}_{dt}==1$ & $\hat{y}_{dl}==1$) & $\hat{y}_d(n)==1$)DFE_PDOUT=2, else if ($\hat{y}_d(n-1)==1$ & $\hat{y}_{de}==1$ & $\hat{y}_{dt}==1$ & $\hat{y}_{dl}==1$) & $\hat{y}_d(n)==0$)DFE_PDOUT=−2, else if ($\hat{y}_d(n-1)==1$ & $\hat{y}_{de}==1$ & $\hat{y}_{dt}\leq 1$ & $\hat{y}_{dl}==0$) & $\hat{y}_d(n)==0$)DFE_PDOUT=−1, else if ($\hat{y}_d(n-1)==1$ & $\hat{y}_{de}==1$ & $\hat{y}_{dt}==0$ & $\hat{y}_{dl}==0$) & $\hat{y}_d(n)==0$)DFE_PDOUT=1, else if ($\hat{y}_d(n-1)==1$ & $\hat{y}_{de}==01$ & $\hat{y}_{dt}==0$ & $\hat{y}_{dl}==0$) & $\hat{y}_d(n)==0$)DFE_PDOUT=2, else if ($\hat{y}_d(n-1)==1$ & $\hat{y}_{dt}==0$ & $\hat{y}_d(n)==1$)DFE_PDOUT=1, else if ($\hat{y}_d(n-1)==1$ & $\hat{y}_{dt}==0$ & $\hat{y}_d(n)==1$)DFE_PDOUT=1, else DFE_PDOUT=0

DFE Equalized Vertical Multi-Level Phase Detectors

Figure 9:
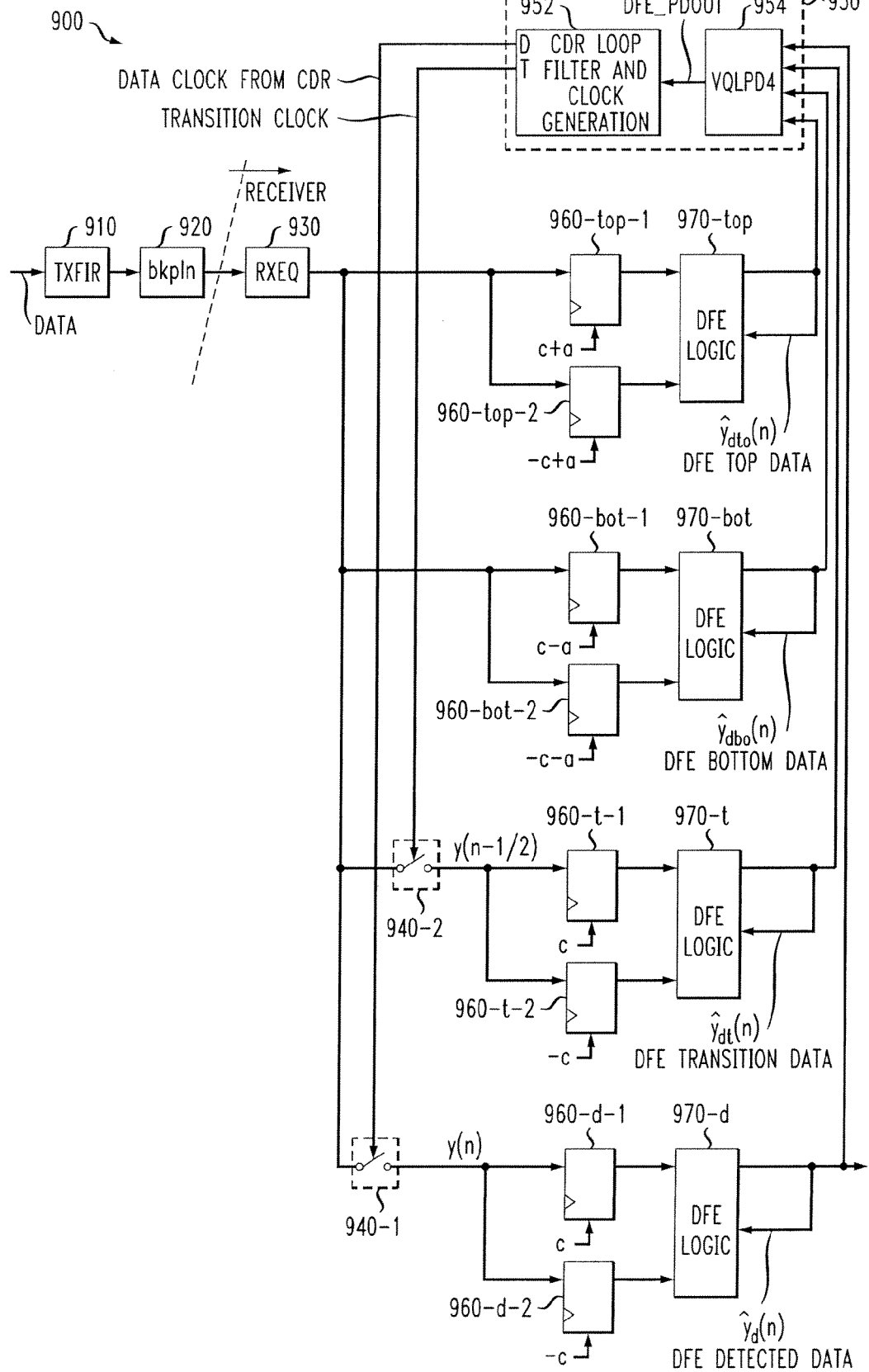
FIG. 9 is a block diagram of an exemplary four level oversampled phase detector based DFE equalized CDR that uses vertical slicing.

FIG. 9 is a block diagram of an exemplary four level oversampled phase detector based DFE equalized CDR 900 that uses vertical slicing. The channel 900 of FIG. 9 comprises a transmit FIR filter (TXFIR) 910, backplane channel 920 and RXEQ 930, in a similar manner to FIG. 5. In addition, the channel 900 comprises two switches 940-1 and 940-2 to sample the analog output of the RXEQ 930 at the baud rate, each according to a corresponding clock.

As shown in FIG. 9, four pairs of exemplary latches 960-top, 960-bot, 960-t and 960-d having the thresholds shown in FIG. 9, are used to generate top, bottom, transition and detected data decisions for the DFE equalized signal, respectively.

The DFE detected data, transition data, top data and bottom data generated by the DFE logic 970-$d$, 970-$t$, 970-top and 970-late, respectively, are used as the input to the VQLPD4 phase detector 954 operation to produce the overall DFE phase detector output timing estimate.

Consider a vertical slicing phase detector architecture without a DFE. Such an architecture would use the normal data sample ŷ(n), and the transition date, ŷ(n−½) but not use "early" and "late" signals. Instead at the normal data sample instance, the phase detector would create two additional signals "top" and "bottom" based on slicer thresholds of a and −alpha. These signals would be called ŷto(n) and ŷbo(n) for top and bottom respectively. Note that the truth table for a vertical pseudo linear phase detector with 4 output levels (VQLDP4) will be different than that of the standard QLPD4 phase detector truth table. In the DFE case we need to produce DFE equalized versions of these signals i.e. produce these signals would be called ŷdto(n) and ŷdbo(n) for top and bottom respectively. These can be superimposing the DFE thresholds of c and −c with the vertical phase detector threshold a and −a.

It is to be understood that the embodiments and variations shown and described herein are merely illustrative of the principles of this invention and that various modifications may be implemented by those skilled in the art without departing from the scope and spirit of the invention. For example, the phase detector need not be implemented as the exemplary BBPD or four level QLPD used in the exemplary embodiments described herein. In addition, the phase detector can be compromised of any number of output levels and the corresponding additional input bits generated from clocks spaced at sub-multiples of the baud period.

The CDR digital loop filter can be decimated or decimated in a parallel sampled fashion, as described in U.S. patent application Ser. No. 10/965,138, filed Oct. 14, 2004, entitled, "Parallel Sampled Multi Stage Decimated Digital Loop Filter For Clock/Data Recovery." A parallel sampled approach means additional complexity but is otherwise a straightforward extension of the present invention. The loop filter may or may not incorporate look ahead techniques, as described in U.S. patent application Ser. No. 11/029,977, filed Jan. 5, 2005, entitled, "Look Ahead Digital Loop Filter Architecture."

While the exemplary embodiments employ a one tap DFE, the disclosed architecture can be extended with more complexity to additional DFE taps, as would be apparent to a person of ordinary skill. The logic equations to generate ($\hat{y}_{dt}$(n),$\hat{y}_{de}$(n),$\hat{y}_{dl}$(n), (or additional signals if considering a phase detector with more levels) will change accordingly.

The DFE logic examples shown for the one tap DFE including logic to generate DFE transition, early, and late data for the DFE phase detectors assume an equivalent positive DFE coefficient, i.e., b(1)=c where c>0. As would be apparent to one familiar with the art, the corresponding logic is easily derived for c<0.

Figure 10:
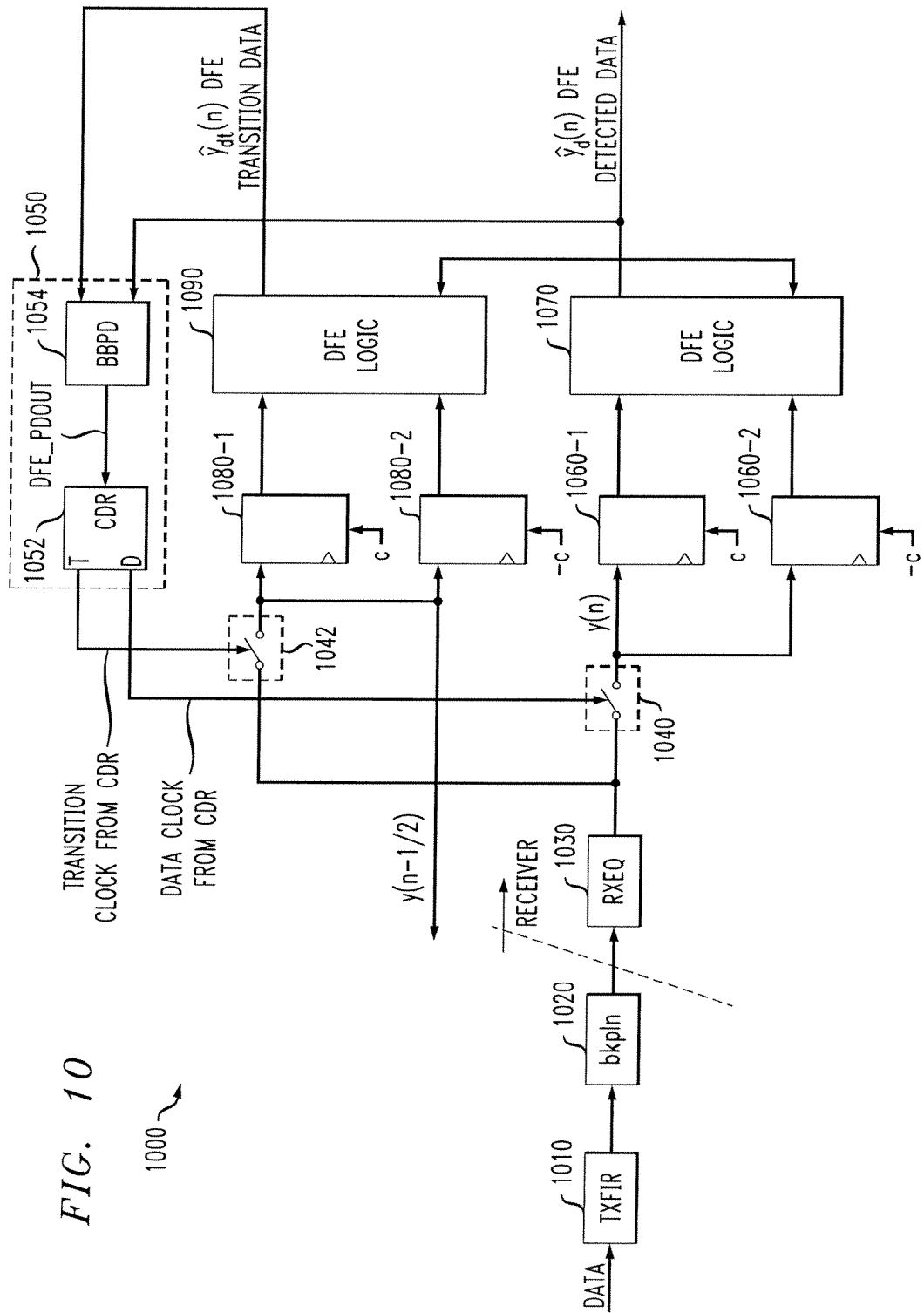
FIG. 10 is a block diagram of a serializer/deserializer communication channel in accordance with the present invention.

FIG. 10 is a block diagram of a serializer/deserializer communication channel 1000 in accordance with the present invention. The channel 1000 of FIG. 10 comprises a transmit FIR filter (TXFIR) 1010, backplane channel 1020, RXEQ 1030, switches 1040, 1042, CDR circuit 1050, exemplary latches 1060-1 and 1060-2 and 1080-1 and 1080-2, and DFE logic 1070 and 1090, in a similar manner to FIG. 5.

The embodiment of FIG. 10 uses previous DFE detected data bit to make the decision about the current DFE transition bit (instead of previous DFE transition bit as in the embodiment of FIG. 5). It is noted that the techniques shown in FIG. 10 for a bang bang phase detector 1054 can be extended to the multi-level phase detectors shown in FIGS. 7 through 9. Generally, a current DFE decision for the DFE early and late signals could be based on, for example, the previous DFE data bit or previous DFE transition bit.

In the embodiment of FIG. 10, for the case when $\hat{y}_d(n-1) = 1$, $\hat{y}_{dt}(n) = 1$ if $y(n-1/2) > c$
$= 0$ if $y(n-1/2) < c$.

For the case when $\hat{y}_d(n-1) = 0$, $\hat{y}_{dt}(n) = 1$ if $y(n-1/2) > -c$
$= 0$ if $y(n-1/2) < -c$ where y(n−½) represents the amplitude of the non-DFE transition sampled data.

It is to be understood that the embodiments and variations shown and described herein are merely illustrative of the principles of this invention and that various modifications may be implemented by those skilled in the art without departing from the scope and spirit of the invention.

We claim:

1. A method for generating one or more clock signals in a receiver employing decision-feedback equalization, comprising:
    sampling a received signal using a data clock and a transition clock to generate a data sample signal and a transition sample signal;
    obtaining a DFE correction for each of said data sample and transition sample signals to generate DFE detected data and DFE transition data; and
    adjusting a phase of one or more of said data clock and said transition clock based said DFE detected data and said DFE transition data.

2. The method of claim 1, wherein said DFE corrections are subtracted from said received signal in a feedback fashion.

3. The method of claim 1, wherein said DFE corrections are selected using DFE logic from a plurality of precomputed values to generate said DFE detected data and said DFE transition data.

4. The method of claim 3, wherein at least one of said DFE detected data and said DFE transition data are based on a prior decision.

5. The method of claim 1, further comprising the step of applying an output of said phase detector to a clock and data recovery circuit that generates said data and transition clocks.

6. The method of claim 1, wherein said phase detector is a bang-bang phase detector.

7. The method of claim 1, wherein said phase detector is a multi-level oversampled phase detector.

8. The method of claim 7, wherein said sampling step further comprises the step of sampling said received signal using a clock associated with each of said levels.

9. The method of claim 8, further comprising the step of selecting from a plurality of precomputed values to generate DFE data associated with each of said levels.

10. The method of claim 7, further comprising the step of latching said samples using a vertical slicing technique to generate DFE data associated with each of said levels.

11. A receiver employing decision-feedback equalization, comprising:

a plurality of switches to sampling a received signal using a data clock and a transition clock to generate a data sample signal and a transition sample signal;

at least one decision-feedback equalization (DFE) block for generating a DFE correction for each of said data sample and transition sample signals to generate DFE detected data and a DFE transition data; and a phase detector for adjusting a phase of one or more of said data clock and said transition clock based said DFE detected data and said DFE transition data.

12. The receiver of claim 11, wherein said DFE corrections are subtracted from said received signal in a feedback fashion.

13. The receiver of claim 11, further comprising DFE logic for selecting said DFE corrections from a plurality of precomputed values to generate said DFE detected data and said DFE transition data.

14. The receiver of claim 13, wherein at least one of said DFE detected data and said DFE transition data are based on a prior decision.

15. The receiver of claim 11, wherein an output of said phase detector is applied to a clock and data recovery circuit that generates said data and transition clocks.

16. The receiver of claim 11, wherein said phase detector is a bang-bang phase detector.

17. The receiver of claim 11, wherein said phase detector is a multi-level oversampled phase detector.

18. The receiver of claim 17, wherein said plurality of switches sample said received signal using a clock associated with each of said levels.

19. The receiver of claim 18, further comprising DFE logic to generate DFE data associated with each of said levels from a plurality of precomputed values.

20. The receiver of claim 17, further comprising a plurality of latches for latching said samples using a vertical slicing technique to generate DFE data associated with each of said levels.

21. A receiver employing decision-feedback equalization, comprising:

a plurality of switches to sampling a received signal using a data clock and a transition clock to generate a data sample signal and a transition sample signal;

at least one decision-feedback equalization (DFE) block for generating a plurality of precomputed DFE corrections for each of said data sample and transition sample signals;

DFE logic for selecting one of said precomputed DFE corrections to generate said DFE detected data and said DFE transition data; and a phase detector for adjusting a phase of one or more of said data clock and said transition clock based said DFE detected data and said DFE transition data.

22. The receiver of claim 21, wherein an output of said phase detector is applied to a clock and data recovery circuit that generates said data and transition clocks.

\* \* \* \* \*